United States Patent
Craig et al.

(10) Patent No.: US 7,250,080 B1
(45) Date of Patent: Jul. 31, 2007

(54) PROCESS FOR THE MANUFACTURE OF ORGANOSILICON COMPOUND-TREATED PIGMENTS

(75) Inventors: Daniel H. Craig, Edmond, OK (US); Mark D. Westmeyer, Englewood, OH (US)

(73) Assignee: Tronox LLC, Oklahoma City, OK (US)

( * ) Notice: Subject to any disclaimer, the term of this patent is extended or adjusted under 35 U.S.C. 154(b) by 0 days.

(21) Appl. No.: 11/516,157

(22) Filed: Sep. 6, 2006

(51) Int. Cl.
C09C 3/12 (2006.01)
C09C 1/36 (2006.01)
B05D 1/02 (2006.01)
B05D 3/02 (2006.01)
B05D 5/00 (2006.01)

(52) U.S. Cl. .............. 106/445; 106/438; 106/439; 106/441; 106/442; 106/443; 106/446; 106/447; 427/218; 427/219; 427/220; 427/387; 427/402; 427/421.1; 523/212; 523/213

(58) Field of Classification Search ............. 106/438, 106/439, 441, 442, 443, 445, 446, 447; 427/218, 427/219, 220, 387, 402, 421.1; 523/212, 523/213
See application file for complete search history.

(56) References Cited

U.S. PATENT DOCUMENTS

| | | |
|---|---|---|
| 3,132,961 A | 5/1964 | Pierpoint et al. |
| 3,208,866 A | 9/1965 | Lewis et al. |
| 3,227,675 A | 1/1966 | Papalos |
| 3,512,219 A | 5/1970 | Stern et al. |
| 3,567,680 A | 3/1971 | Iannicelli |
| 3,834,924 A | 9/1974 | Grillo |
| 3,856,929 A | 12/1974 | Angerman et al. |
| 4,061,503 A | 12/1977 | Berger et al. |
| 4,141,751 A | 2/1979 | Moreland |
| 4,151,154 A | 4/1979 | Berger et al. |
| 4,186,028 A | 1/1980 | Woditsch et al. |
| 4,344,799 A | 8/1982 | Kohler et al. |
| 4,375,989 A | 3/1983 | Makinen |
| 4,514,231 A | 4/1985 | Kerner et al. |
| 4,599,114 A | 7/1986 | Atkinson |
| 4,801,445 A | 1/1989 | Fukui et al. |
| 4,810,305 A | 3/1989 | Braun et al. |
| 4,882,225 A | 11/1989 | Fukui et al. |
| 4,935,063 A | 6/1990 | Costanzi |
| 5,035,748 A | 7/1991 | Burow et al. |
| 5,201,949 A | 4/1993 | Allen et al. |
| 5,203,916 A | 4/1993 | Green et al. |
| 5,332,433 A | 7/1994 | Story et al. |
| 5,501,732 A | 3/1996 | Niedenzu et al. |
| 5,562,990 A | 10/1996 | Tooley et al. |
| 5,607,994 A | 3/1997 | Tooley et al. |
| 5,631,310 A | 5/1997 | Tooley et al. |
| 5,653,794 A | 8/1997 | Weber et al. |
| 5,700,318 A | 12/1997 | Brand et al. |
| 5,707,437 A | 1/1998 | Niedenzu et al. |
| 5,840,112 A | 11/1998 | Morris et al. |
| 5,889,090 A | 3/1999 | Tooley et al. |
| 5,922,120 A | 7/1999 | Subramanian et al. |
| 5,959,004 A | 9/1999 | Tooley et al. |
| 5,976,237 A | 11/1999 | Halko et al. |
| 6,126,915 A | 10/2000 | Tunashima et al. |
| 6,133,360 A | 10/2000 | Barren et al. |
| 6,139,617 A | 10/2000 | Halko et al. |
| 6,174,517 B1 * | 1/2001 | Hansenne et al. ............ 424/59 |
| 6,207,131 B1 | 3/2001 | Magyar et al. |
| 6,214,106 B1 | 4/2001 | Weber et al. |
| 6,350,427 B1 | 2/2002 | Yuill et al. |
| 6,395,858 B1 | 5/2002 | Mack et al. |
| 6,455,158 B1 | 9/2002 | Mei et al. |
| 6,524,705 B1 * | 2/2003 | O'Lenick et al. ........... 428/402 |
| 6,562,314 B2 | 5/2003 | Akhtar et al. |
| 6,573,018 B2 | 6/2003 | Ishibashi et al. |
| 6,576,052 B1 | 6/2003 | Takahashi et al. |
| 6,616,746 B2 | 9/2003 | Takahashi et al. |
| 6,620,234 B1 | 9/2003 | Kostelnik et al. |
| 6,660,281 B1 * | 12/2003 | Nakanishi et al. .......... 424/401 |
| 6,663,851 B1 | 12/2003 | Deller et al. |
| 6,770,327 B2 | 8/2004 | Edelmann et al. |
| 6,841,197 B2 | 1/2005 | Standke et al. |
| 6,894,089 B2 * | 5/2005 | Mei et al. ................... 523/212 |
| 6,958,091 B1 * | 10/2005 | Craig ......................... 106/447 |
| 2002/0172697 A1 | 11/2002 | Nakade et al. |
| 2003/0027896 A1 | 2/2003 | Amano et al. |
| 2003/0079655 A1 | 5/2003 | Takahashi et al. |
| 2005/0129602 A1 | 6/2005 | Takahashi et al. |
| 2005/0197428 A1 * | 9/2005 | May ........................... 523/210 |
| 2006/0045841 A1 * | 3/2006 | Craig et al. ................ 423/610 |

* cited by examiner

Primary Examiner—Anthony J. Green
(74) Attorney, Agent, or Firm—William B. Miller

(57) ABSTRACT

An improved process for making an organosilicon compound surface-treated titanium dioxide material, comprising (a) forming a mixture of the titanium dioxide material in water, (b) wet milling the mixture, (c) adjusting the pH of the slurry resulting from step (b) to between about 5.0 and about 8.5, (d) after step (c), removing the titanium dioxide material from the mixture by vacuum or pressure filtration, (e) after step (d), washing the titanium dioxide material so removed, (f) after step (e), converting the washed titanium dioxide material to a fluid dispersion having a pH of from about 3.5 to less than about 7 via addition of a fluidizing agent comprising a water-soluble monoprotic acid, (g) after, or concurrently with, step (f), adding to the resulting dispersion of titanium dioxide material an organosilicon compound, with mixing, and (h) spray drying the dispersion of the washed titanium dioxide material resulting from step (g) to yield a dry titanium dioxide pigment powder.

14 Claims, No Drawings

PROCESS FOR THE MANUFACTURE OF ORGANOSILICON COMPOUND-TREATED PIGMENTS

FIELD OF THE INVENTION

This invention relates to an improved method of surface-treated titanium dioxide pigment manufacture utilizing organosilicon compounds and to the titanium dioxide pigments produced by the improved method. The pigments produced according to this method are useful in coatings and in thermoplastics.

BACKGROUND OF THE INVENTION

Inorganic pigments are used as opacifiers and colorants in many industries including the coatings, plastics, and paper industries. In general, the effectiveness of the pigment in such applications depends on how evenly the pigment can be dispersed in a coating, in plastic or in paper. For this reason, pigments such as titanium dioxide are generally handled in the form of a finely divided powder. Titanium dioxide powders are inherently dusty, however, and frequently exhibit poor powder flow characteristics during the handling of the powder itself, especially during formulation, compounding, and manufacture of end-use products.

While free-flowing powders with low dust properties can be obtained through changes in the process for making these materials, these powders usually also exhibit reduced opacifying properties. To this end, chemical modification of titanium dioxide pigment surfaces has been the preferred approach to achieving the desired balance of pigment opacity and flow characteristics. Thus it is known in the art that the wetting and dispersing properties of titanium dioxide pigments can be improved by exposure to certain inorganic treatments, for example, depositing inorganic metal oxide and/or metal hydroxide coatings on the surface of the titanium dioxide. In addition, certain other chemical modifications of titanium dioxide pigment surfaces, involving treatment with organic compounds such as certain organic polyols, are also known to improve pigment performance, including helping to reduce the tendency of a pigment to adsorb moisture and improving the pigment's gloss characteristics, particularly in coatings. In plastics, as another example, improved pigment dispersion through inorganic and/or organic surface treatment of a titanium dioxide pigment likewise results in better processing and improved uniformity of color.

With regard to the present invention, it is, in particular, known to treat titanium dioxide pigment surfaces with organosilicon compounds. Organosilicon compound surface treatments serve to enhance the compatibility between the pigment and organic polymers in which the pigment is placed and so improve the reinforcing properties of the pigment when formulated into organic polymer matrices, such as in thermoplastic concentrates, but are especially of interest for their non-migrating character as they react with and are bound to the pigment surface.

The most advantageous organosilicon treatment in more general terms will depend on what particular end-use is intended for the surface-treated pigment, whether in thermoplastics, coatings or in paper. Accordingly, many patents have been issued disclosing methods for improving titanium dioxide pigments wherein an organosilicon compound is deposited onto the pigment surface prior to its incorporation into such end use materials as plastics, and to a lesser extent in coatings, inks and paper.

For example, U.S. Pat. No. 3,132,961 discloses a process for rendering finely divided non-alkaline filler material hydrophobic by contacting said finely divided filler material with a diorganopolysiloxane in the presence of an acid. Among the filler materials described are silica, clay, iron oxides, and titanium dioxide.

U.S. Pat. No. 3,227,675 describes the surface treatment of kaolin clay with up to 10% by weight based on clay of an organo-functional silane for the purpose of providing improved clay-reinforcing properties to thermosetting resins.

U.S. Pat. No. 3,567,680 discloses use of mercaptosilane grafted inorganic pigments in combination with aminosilane treated pigment, to achieve higher filler reinforcement of elastomers and plastics.

U.S. Pat. No. 3,834,924 discloses an improved process for producing surface modified, finely divided inorganic pigments comprising the addition of an amino organosilane to a high solids content aqueous dispersion of said inorganic pigment, with subsequent extrusion and drying. These pigments are useful as fillers for paper, paints, inks, and as reinforcing pigments in elastomers and polymeric materials.

U.S. Pat. No. 4,061,503 discloses the treatment of particulate titanium dioxide with a polyether substituted silicon compound which serves to enhance its employment in pigmented and/or filled paints and plastics, and in reinforced plastic composite compositions.

U.S. Pat. No. 4,141,751 discloses a process for the modification of hydrophilic particulate and/or fibrous crystalline and/or amorphous inorganic substances with silane coupling agents to produce materials which are eminently suitable for use as reinforcing filler/extender pigments in polymeric, polymeric alloy, and polymeric/ceramic alloy compositions.

U.S. Pat. No. 4,151,154 discloses compositions comprising inorganic particles containing on their surfaces a silane, its hydrolyzates or resulting condensates, which silane possesses at least two to about three hydrolyzable groups bonded to the silicon thereof and an organic group which contains a polyalkylene oxide group. These modified inorganic particles exhibit enhanced performance in pigmented and/or filled paints and plastics, and in reinforcing plastic composite structures.

U.S. Pat. No. 4,344,799 is directed toward titanium dioxide pigments with a coating of hydrophobicizing and hydrophilicizing organic substances, wherein the hydrophobicizing organic substance is an organic silicon compound and/or an organic phosphorus compound and the hydrophilicizing organic compound is an amino alcohol. These pigments are readily dispersible which simplifies their use in pigmenting laquers, plastics, and paper.

U.S. Pat. No. 4,375,989 discloses improved dispersibility of a titanium dioxide pigment by coating the pigment with an organic coating selected from the group comprising large-molecule fatty acids and their salts; organic silicon compounds, such as dimethyl polysiloxane; alcohols and polyalcohols. The titanium dioxide pigment also comprises a coating of an inorganic substance.

U.S. Pat. No. 4,514,231 is directed to the modification of natural oxidic or silicate fillers with water insoluble sulfur containing organosilicon compounds. The fillers are converted into an aqueous suspension and treated with the organosilicon compounds, in some cases in the presence of an emulsifier to improve reaction between the filler and the organosilicon compound. The compositions are particularly suitable for use in vulcanizable and moldable mixtures which are produced according to customary processes in the rubber industry.

U.S. Pat. No. 4,810,305 describes a modified hydrophobic colored or magnetic pigment or filler comprising a hydrophobic pigment or filler containing a surface treatment derived from an organopolyhydrosiloxane. Compositions include titanium dioxide pigments and are useful as pigments or fillers in synthetic resins.

U.S. Pat. No. 4,801,445 and U.S. Pat. No. 4,882,225 are directed toward cosmetics compositions containing modified powders or particulate materials having a silicone polymer film coated on substantially the entire surface, said silicone polymer being derived from at least one silicone compound containing an Si—H group.

U.S. Pat. No. 4,935,063 discloses inorganic fillers or pigments having simultaneous reinforcing effect and stabilizing effect on organic polymers obtained by a process comprising bringing the inorganic filler or pigment into contact with a solution, in an inert organic solvent, of a sterically hindered amine comprising one or more alkoxysilane groups in its molecule, maintaining the obtained mixture at higher than ambient temperature for a period of at least 0.5 hours, removing the solvent, and recovering the stabilizing filler or pigment obtained.

U.S. Pat. No. 5,035,748 describes an inorganic pigment comprising a content of at least 0.1% by weight and at most 5% by weight of one or more polyorganosiloxanes, wherein the polyorganosiloxanes have viscosities of 10 to 100,000 mPa·s and a relative molecular weight of 500 to 500,000, have no reactive or crosslinking groups, contain at least one $C_9$-$C_{25}$ Si-alkyl and/or one $C_9$-$C_{25}$ Si-aryl group per molecule, the total content of these groups in the polyorganosiloxane being 7-70% by weight and the other organic radicals contained in the polyorganosiloxane having 1 to 8 carbon atoms. These pigments can be used in laquers, emulsion paints, plastics, toners, magnetic recording materials, building materials, and enamels.

U.S. Pat. No. 5,501,732 discloses an improved process for preparing silanized titanium dioxide pigment for plastic and coating applications using a titanium dioxide slurry as a feedstock, wherein the viscosity of the high solids titanium dioxide slurry is reduced by adjusting the pH of the slurry in the range of about 7.5 to about 11.

U.S. Pat. No. 5,562,990 discloses organosilicon treatment of titanium dioxide particles coated with alumina or alumina-silica having a fluoride compound or fluoride ions associated with them to improve photostability and humidity resistance when incorporated in powder coatings and/or plastics.

U.S. Pat. No. 5,607,994, U.S. Pat. No. 5,631,310, U.S. Pat. No. 5,889,090, and U.S. Pat. No. 5,959,004 claim processes and compositions relating to white-pigmented polymers (particularly, polyolefins such as polyethylene) containing white pigments treated with at least one silane or a mixture of at least one silane and at least one polysiloxane resulting in improved processibility in thermoplastics compounding and improved performance properties, such as lacing resistance, in a polymeric matrix. Preferred silanes compounds are alkyl trialkoxysilanes.

U.S. Pat. No. 5,653,794 and U.S. Pat. No. 6,214,106 B1 disclose processes for the manufacture of hydrophobic inorganic oxides which comprise reacting inorganic oxide particles with organohalosilanes, preferably organochlorosilanes, to produce hydrophobic organosilane coated inorganic oxides, and compositions resulting from said processes. The inorganic oxide pigments prepared by these processes exhibit enhanced compatibility and adhesion between the pigment and organic matrices, such as thermoplastics. It is preferred that the organohalosilane compounds be reacted with the inorganic oxide particles in an aqueous slurry.

U.S. Pat. No. 5,707,437 describes titanium dioxide pigment particles with treatment of an organosilicon compound and boric acid and/or boron oxide. The resulting compositions, when incorporated into a polymer, exhibits humidity resistance, enhanced dispersion, and resistance to yellowing or discoloration of the pigmented polymer upon exposure to ultraviolet light. The resulting compositions are particularly useful in powder coatings and/or plastics applications.

U.S. Pat. No. 6,126,915 describes titanium dioxide powder with a greatly decreased volatile moisture content obtained by surface treating with a calcium salt and/or a silane coupling agent. Thermoplastic masterbatches containing this titanium dioxide powder do not exhibit defects due to foam generation resulting from high temperature processing.

U.S. Pat. No. 6,133,360 discloses thermoplastic resin compositions containing an aromatic polycarbonate resin and a surface modified titanium dioxide having a first coating and no further coatings. Preferred titanium dioxide first coating materials are polyols or polysiloxanes. The thermoplastic resin compositions exhibit improved resistance to streaking compared to such thermoplastic resin compositions which incorporate titanium dioxide having a first coating and at least one additional coating.

U.S. Pat. No. 6,395,858 discloses aminopropyl-functional siloxane oligomers, to the processes for preparing said oligomers, and to their use as reinforcing agents, surface modifying agents, or in coatings.

U.S. Pat. No. 6,455,158 B1 relates to the silanization or surface treatment of minerals with alkylsilanes and alkylsilane copolymers and to alkylsilane copolymers useful for surface treating pigments or fillers. The alkylsilane copolymers comprise at least two different monomers and find utility for the surface treatment of white pigments, such as titanium dioxide, for improving the dispersibility and processibility of the pigments when compounded with a polymeric material such as polyolefins.

U.S. Pat. No. 6,573,018 B2 describes surface-treated metallic oxide fine powders comprising a silane coupling agent containing primary amino groups useful in powder coatings or electrophotographic toners.

U.S. Pat. No. 6,576,052 B1 discloses titanium dioxide particles comprising a coating layer of an aluminum phosphate compound and a coating layer of the hydrolyzate of an organosilane compound, said pigment exhibiting improved light fastness, lacing resistance, and dispersibility in plastics.

U.S. Pat. No. 6,616,746 B2 describes a titanium dioxide pigment having on the surface a coating layer comprising a polyhydric alcohol and a hydrolysis product of an aminosilane compound. The pigment is useful as a coloring agent for plastics.

U.S. Pat. No. 6,620,234 B1 provides a treatment method for rendering titanium dioxide pigment hydrophobic by predispersing a suitably reactive organohalosilane into an aqueous media, using intensive mixing means to form a reactive dispersion, followed by exposing titanium dioxide particles to said reactive dispersion. The resulting pigments have good dispersibility in nonpolar substances such as plastics.

U.S. Pat. No. 6,663,851 B1 discloses a product obtained by treating surface-modified, pyrogenically produced titanium dioxide with at least one ammonium-functional silane, useful in the field of cosmetics in sunblocks, in toner powders, in paints and varnishes, in silicone rubber, and as abrasives and polishes.

U.S. Patent Application Publication No. US 2002/0172697 A1 describes a metal oxide-organopolysiloxane hybrid powder, a method for the preparation thereof, and a cosmetic composition containing said powder.

U.S. Patent Application Publication No. US 2003/0027896 A1 discloses a surface modified inorganic oxide powder having a surface modified with a mixed solution, which includes an organopolysiloxane and a silane compound. The resulting powders improve reinforcement of polar resins.

U.S. Patent Application Publication No. US 2003/0079655 A1 discloses a titanium dioxide pigment having a surface coating layer comprising a polyhydric alcohol and a hydrolysis product of an aminosilane compound, has a dispersibility of not more than 20 kg/cm$^2$ as judged in terms of resin pressure increase, and is excellent in hydrophobicity and dispersibility. The pigment is useful as a coloring agent for plastics.

U.S. Pat. No. 6,770,327 discloses aminoalkylalkoxy silane mixtures comprising optionally, alkyl or hydroxyalkyl-functionalized siloxanes, to processes for preparing said mixtures, and to their use as reinforcing agents, surface modifying agents, or in coatings.

U.S. Pat. No. 6,841,197 discloses oligomer mixtures of n-propylethoxy silanes, to processes for preparing said mixtures, and to their use as reinforcing agents, surface modifying agents, or in coatings.

DE 197 51 857 A1 describes a method for producing phosphonatosiloxane-treated inorganic particles by incorporating organophosphonate compounds into organosiloxane compounds, such compounds being useful in plastics applications.

European Patent Specification EP 1 065 234 B1 relates to novel silicones for powder treatment, powders having the surface treated with such silicones, and cosmetic materials containing such surface-treated powders, wherein the surface treatment imparts to the powder a high affinity for fats and oils, including ester oils, glycerides, silicone oils, and fluorinated oils.

European Patent Specification EP 1 245 646 B1 describes titanium dioxide pigments having excellent light fastness and hydrophobic characteristics wherein the titanium dioxide is coated with an aluminum phosphate compound followed by a surface treatment with a hydrolyzate of an organosilane compound yielding a pigment particularly suited for use in plastics.

European Patent Specification EP 1 424 373 A2 relates to hydrophilized powders wherein the powder surface is treated with a polyether-modified silicone, and to their application in cosmetics, coatings, and inks.

U.S. Patent Application Publication No. US 2005/0129602 A1 discloses a process for production of titanium dioxide pigment and resin compositions comprising coating the hydrolysis product of an alkylsilane compound containing at least one $C_6H_{13}$ group by dry processing on surfaces of particles of titanium dioxide.

From the citations given above it is clear that many uses of organosilicon compound-treated pigments have been documented. However, in none of the references cited above are processes disclosed which describe aqueous treatment of pigments with alkyltrialkoxysilanes and dialkyldialkoxysilanes at pH values of between about 3.5 and about 7 in the presence of monoprotic acids. Alkyltrialkoxysilanes and dialkyldialkoxysilanes tend to oligomerize and crosslink to a lesser extent in this pH range and so are more effectively and easily applied to a titanium dioxide pigment as a surface treatment. Nevertheless, the slow rate of reaction of alkyltrialkoxysilanes and dialkyldialkoxysilanes in this pH range tends also to lead to undesired increases in manufacturing cycle-time, perhaps providing an explanation for the comparative absence of art pertaining to the surface treatment of titanium dioxide pigments with organosilicon compounds in this mildly acidic pH range.

Prior to treatment with organosilicon compounds, rutile titanium dioxide is commonly produced from titanium tetrachloride using vapor phase oxidation processes as disclosed in any number of patents and other printed publications, for example, in U.S. Pat. Nos. 3,208,866, 3,512,219, 5,840,112, 6,207,131 and 6,350,427. The reaction effluent from these vapor phase oxidation systems is generally cooled immediately upon leaving the reaction chamber, yielding a solid, agglomerated titanium dioxide intermediate.

This intermediate typically undergoes further processing steps in order to provide a finished product suitable for the uses listed above, including:

(1) dispersing the intermediate (or crude) material in an aqueous medium using a dispersing agent such as a polyphosphate, (2) wet milling the resulting slurry to achieve a reduced particle size, (3) precipitating inorganic oxides such as silica or alumina onto the particle surfaces of the wet milled titanium dioxide slurry, (4) recovering the alumina- and/or silica-treated titanium dioxide pigment from the aqueous slurry by filtration, (5) washing the filtered product to remove residual salts and impurities, (6) drying the washed filtered product, and (7) dry-milling the dried pigment using a fluid energy mill.

The deposition of inorganic oxides according to step (3), such as with silica or alumina onto the wet-milled titanium dioxide, is known to provide some desired pigment end-use properties as well as enabling the pigment to be recovered and washed using conventional vacuum-type and/or pressure-type filtration systems during manufacture.

For example, silica is typically added to impart improved resistance to the deleterious effects of ultraviolet light in pigmented end-use applications, whereas alumina is typically added to ensure smooth processing through filtration, drying, and fluid energy milling. Unfortunately, in some cases the presence of the inorganic oxides has also been observed to reduce the dispersibility of the dry pigment in coatings and thermoplastics so that as an alternative to added alumina, for instance, polymeric flocculants and/or multivalent metal ion flocculating salts have been added to the wet milled titanium dioxide dispersion in order to enable the pigment to still be collected and recovered using conventional vacuum-type and/or pressure-type filtration systems. However, the polymeric flocculants frequently themselves detract from the performance of the processed titanium dioxide product.

When spray drying is used to dry the titanium dioxide material following step (5), the washed titanium dioxide material is typically diluted with additional carrier liquid to enable delivery of the titanium dioxide material slurry to the spray dryer system as a fluid rather than a semi-solid. This dilution step, while enabling more practical and consistent conveyance of the semi-solid material to the spray dryer itself, can result in slower spray dryer throughput rates due to the presence of the additional carrier medium, as well as higher energy costs associated with the removal of the larger quantities of carrier liquid. One attempt to provide an improvement to this situation, wherein the washed titanium dioxide material, often referred to as "press cake" or "filter cake", is converted into a low viscosity slurry via the addition of an alkalinizing agent, is described in commonly-assigned and co-pending U.S. patent application Ser. No. 10/928,387, filed Aug. 30, 2004 for "Improved Process for making Titanium Dioxide and Resulting Product". In this particular case, the low viscosity slurry enables the efficient spray drying of titanium dioxide pigment intermediate while at the same time providing a pigment with improved processibility when formulated into thermoplastics. However, the usefulness of the disclosed viscosity reduction process is explicitly restricted to pigments wherein substantially no inorganic oxides have been deposited on the titanium dioxide material to be spray-dried.

Several references describe alternate methods for rendering pigment press cake or filter cake into a low viscosity fluid:

U.S. Pat. No. 4,186,028 describes improved fluid aqueous pigment dispersions, including titanium dioxide dispersions, comprising employment of a phosphonocarboxylic acid or salt thereof as a dispersion aid. In one particularly preferred embodiment, filter cakes which are normally difficult to transport are liquified by the addition of phosphonocarboxylic acids and transported in thin form to a drying or calcining unit to save energy costs.

U.S. Pat. No. 4,599,114 describes the treatment of titanium dioxide and other pigments with a surfactant compound consisting of the reaction product of a diamine, a carboxylic acid, and a fatty acid, to enhance the performance of the pigment in paints, plastics, paper making compositions, and reinforced plastic composite compositions. In one example, titanium dioxide press cake is converted into slurry form via vigorous mixing of the press cake with the inventive surfactant compound.

Lastly, U.S. Pat. No. 6,139,617 discloses an improved titanium dioxide pigment exhibiting improved gloss and dispersibility in surface coatings comprising titanium dioxide having deposited thereon a treating agent comprising at least one amine salt of a monoprotic acid.

Despite all the work and effort evidenced in the prior art relating to the development of improved organosilicon compound surface treatments for pigments, or relating to the development of improved processes for the manufacture of organosilicon compound-treated pigments, further improvements are continually being sought.

SUMMARY OF THE PRESENT INVENTION

The present invention provides a unique advancement in the process for applying an organosilicon compound surface treatment to a titanium dioxide pigment, so that an alkyltrialkoxysilane and/or dialkyldialkoxysilane surface treatment can be applied under the mildly acidic conditions preferred for enhancing the "pot-life" of these reactive materials but with a sufficient rate of reaction to provide a commercially practical manufacturing cycle-time. In a further aspect, the present invention in preferred embodiments also provides an advancement in the fluidization and efficient spray-drying of pigment press cake (or filter cake) which is thereby able to employ an inorganic surface treatment preferred for many end uses (but which had heretofore entailed substantial dilution of the press cake before spray-drying), in addition to the aforementioned organosilicon compound surface treatment.

DETAILED DESCRIPTION OF PREFERRED EMBODIMENTS

An improved process according to the present invention comprises:

(a) forming a mixture comprising a titanium dioxide material in water, said titanium dioxide material having been produced by a reaction process including a vapor phase oxidation step and wherein, other than any inorganic oxides formed in said reaction process along with said titanium dioxide material, substantially no inorganic oxides have been deposited on said titanium dioxide material;

(b) wet milling said mixture;

(c) after step (b), optionally depositing on said wet milled titanium dioxide material one or more inorganic oxides selected from the oxides of aluminum, boron, cerium, phosphorus, silicon, tin, titanium and zirconium;

(d) adjusting the pH of the slurry resulting from steps (b) or (c) to a value of between about 5.0 and about 8.5, in order to flocculate said titanium dioxide material whereby the titanium dioxide material may be recovered by vacuum or pressure filtration;

(e) after step (d), removing said titanium dioxide material from said mixture by vacuum or pressure filtration;

(f) after step (e), washing said titanium dioxide material;

(g) after step (f), converting said washed titanium dioxide material to a fluid dispersion having a pH value of about 3.5 to less than about 7 via addition of a fluidizing agent comprising a water-soluble monoprotic acid, optionally and preferably without substantial dilution of the titanium dioxide material;

(h) after, or concurrently with, step (g), adding to the resulting dispersion of titanium dioxide material an organosilicon compound, with mixing;

(i) after step (h), spray drying the dispersion of the washed titanium dioxide material resulting from step (h) to yield a dry titanium dioxide pigment powder.

The resulting dry, organosilicon compound surface-treated titanium dioxide pigment powder optionally and preferably is then post-processed in a fluid energy mill in the presence or absence of additional functional additives known to the art, to finally yield a dry finished pigment product that is suited for incorporation in coatings, in paper or in plastics as desired. Alternatively, the dry, organosilicon compound surface-treated titanium dioxide pigment powder, optionally without but preferably with steam micronization of the pigment powder, can then be combined with a fluid medium in the presence or absence of known functional additives, utilizing methods known to the art, to yield a finished pigment slurry adapted for a desired end use, for example, in coatings or in paper.

As has been discussed previously, the alkyltrialkoxysilanes and dialkyldialkoxysilanes would for ease of handling and application ideally be applied to titanium dioxide pigments at a mildly acidic pH, namely, a pH of from about 3.5 to less than about 7 precisely according to step (g) above. However, the slow reaction rate and resulting long manufacturing cycles associated with application of these materials under these conditions have heretofore proven an impediment in the surface treating of titanium dioxide pigments. The present invention is based upon the discovery that by spray drying a high solids dispersion of filter cake, as enabled by the use of monoprotic acid fluidizing agents even where the pigment in question has incorporated a treatment of one or more inorganic oxides according to step (c), sufficient heat is provided through the spray drying step to effectively promote the desired bonding of the alkyltrialkoxysilane and dialkyldialkoxysilane surface treatments with the pigment surface and reduce the manufacturing cycle time for the pigments to a commercially practical cycle time. Where fluid energy milling (or micronization) is performed in an optional further step, the heat supplied through the micronization of the spray-dried organosilicon compound-treated titanium dioxide can be further used to advance the reaction. In this instance, it will be appreciated that the fluidization of the filter cake can be accompanied with a degree of dilution as needed or as considered appropriate, which would be compensated for by the additional heat of micronization. A more complete reaction of the organosilicon compounds with the surface of the titanium dioxide pigment is seen in turn in improved processibility and dispersibility of the surface-treated titanium dioxide, with lower grit levels, when the pigment is formulated into plastics, such as into polyolefin concentrates, and in improved gloss and tint strength properties when the titanium dioxide pigments produced by the present invention are formulated into coatings systems.

Obviously, apart from the beneficial effect noted on the utility of the alkyltrialkoxysilane and dialkyldialkoxysilane surface treatment materials for treating titanium dioxide pigments, fluidization of the filter cake with one or more monoprotic acids provides benefits generally in enabling the spray drying step to be carried out without a substantial dilution of the titanium dioxide material, even in the presence of one or more inorganic oxides as are desirably added to the titanium dioxide material in many cases for providing wanted end use properties. A higher solids content for the dispersion on spray drying means higher product throughput rates. In addition, substantially less heat energy is required in producing a certain quantity of pigment, since less water is required to be removed from the higher solids feed-reducing the processing costs per ton of pigment produced. For all dispersion solids, the use of low viscosity spray dryer feeds results in pigment with inherently less residual moisture without having to raise the drying temperature.

In general, any type of titanium dioxide material can be processed in accordance with the instant invention. Preferred is rutile titanium dioxide material. Most preferred is rutile titanium dioxide which has been produced from titanium tetrachloride using a vapor phase oxidation step. The titanium dioxide material can also contain an amount of alumina, from aluminum chloride which has been conventionally added as a rutilization aid during the vapor phase oxidation step along with the titanium tetrachloride. Other inorganic oxides formed during the oxidation step may be present as well, to the extent one skilled in the art may wish to incorporate other oxidizable inorganic materials in the oxidation step as has been described or suggested elsewhere for various purposes, for example, particle size control; see, for instance, U.S. Pat. Nos. 3,856,929, 5,201,949, 5,922,120 and 6,562,314.

The system used in the wet milling step of the inventive method can be a disk-type agitator, a cage-type agitator, or generally any other type of wet milling system commonly used in the art. The milling media employed can be sand, glass beads, alumina beads, or generally any other commonly used milling media. The individual grains, particles, or beads of the milling media will preferably be denser than the aqueous slurry used in forming the titanium dioxide dispersion.

Following the wet milling step, an inorganic coating is optionally applied utilizing any of the known processes to effect deposition of inorganic oxides onto the titanium dioxide. The particular inorganic oxides applied and the manner of their application are not critical, and various possibilities are well known to those skilled in the art, so further detail on this aspect is not necessary. By way of example of known inorganic oxide treatment protocols, for plastics end-use applications U.S. Pat. Nos. 5,332,433 and 5,700,318 describe inorganic treatment protocols, as do U.S. Pat. Nos. 5,203,916 and 5,976,237 for coatings end use applications.

The pH of the titanium dioxide dispersion is then adjusted to cause the titanium dioxide material to flocculate. Preferably, a sufficient amount of an acid or base is added to the dispersion during this step to bring the pH of the dispersion to a value in the range of from about 5 to about 9. Most preferably, the pH of the dispersion is adjusted during this step to a value of at least about 5.5 up to about 8.

The flocculated titanium dioxide is then filtered using a vacuum-type filtration system or a pressure-type filtration system and is washed. At this point, the washed normally solid or semi-solid titanium dioxide material, typically having a titanium dioxide solids content of from about 40 percent to about 70 percent by weight and a Brookfield viscosity of more than 10,000 cps, is converted to a fluid dispersion via the direct addition of a fluidizing agent, with mixing. Preferably the viscosity of the resulting titanium dioxide slurry is reduced to a value of less than about 1000 cps. More preferably the viscosity of the titanium dioxide slurry is reduced to a value of less than about 500 cps; most preferably to a value of less than about 100 cps.

The fluidizing agent is preferably added as a dilute aqueous solution, preferably being 25 percent or less in concentration of the fluidizing agent. The preferred final concentration of the fluidizing agent after addition to the washed titanium dioxide is between about 0.025% by weight and about 2% by weight based on the titanium dioxide material. More preferred concentrations of fluidizing agent are between about 0.05% by weight and about 1% by weight based on the titanium dioxide material. Most preferred concentrations of fluidizing agent are between about 0.10% by weight and about 0.5% by weight based on the titanium dioxide material.

Suitable fluidizing agents for the purpose of converting the washed titanium dioxide intermediate into a fluid dispersion are selected from the water-soluble monoprotic acids. Exemplary water-soluble monoprotic acids include nitric acid, hydrochloric acid, and carboxylic acids, sulfonic acids, phosphoric acid diesters and phosphinic acids containing less than about eight carbon atoms, and combinations of one or more of the foregoing. Preferred examples include formic acid, acetic acid, propionic acid, lactic acid, glycolic acid, methanesulfonic acid, p-toluenesulfonic acid, phosphoric acid dimethyl ester, methylphosphonic acid monomethyl ester, dimethylphosphinic acid, hydrochloric acid and nitric acid. The term "water-soluble" as used herein in referring to the water-soluble monoprotic acids means that the acid in question has a solubility in water at room temperature of 0.20% by weight of solution or greater.

Suitable organosilicon compounds comprise not only the aforementioned preferred alkyltrialkoxysilanes and/or dialkyldialkoxysilanes, but also the oligomers of these, mixtures of the oligomers, and the copolymers and co-oligomers of said alkoxysilanes. Generally, the alkyltrialkoxysilanes and dialkyldialkoxysilanes will contain from four carbon atoms up to twenty-eight carbon atoms, though preferably the alkyltrialkoxysilanes and dialkyldialkoxysilanes will contain from four carbon atoms up to eighteen carbon atoms. Most preferred are alkyltrialkoxysilanes and dialkyldialkoxysilanes containing from six carbon atoms up to fourteen carbon atoms. Although not considered material to the practice of the instant invention, polymethylhydrogensiloxanes may also be used in combination with the aforementioned alkyltrialkoxysilanes and dialkyldialkoxysilanes and the oligomers thereof, without departing from the spirit and scope of the claims.

The resulting aqueous dispersion of titanium dioxide is spray dried to produce a dry titanium dioxide pigment powder. The dry product thus produced can be conventionally ground to a desired final particle size distribution using, for example, steam micronization in the presence or absence of additional functional additives as known in the art. Alternatively, the resulting pigment powder can be converted into a fluid slurry, typically an aqueous slurry, utilizing any of the various methods known in the art.

The titanium dioxide pigment powder produced by the process of the present invention is especially suited for use in coatings, cosmetics, and in thermoplastics.

The following examples serve to illustrate specific embodiments of the instant invention without intending to limit or restrict the scope of the invention as disclosed herein. Concentrations and percentages are by weight unless otherwise indicated.

ILLUSTRATIVE EXAMPLES

Example 1

Particulate titanium dioxide pigment intermediate obtained from the vapor phase oxidation of titanium tetrachloride and containing 0.8% alumina in its crystalline lattice was dispersed in water in the presence of 0.18% by weight (based on pigment) of sodium hexametaphosphate dispersant, along with a sufficient amount of sodium hydroxide to adjust the pH of the dispersion to about 9.5 and above, to achieve an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer (Microtrac Inc. Montgomeryville, Pa.). The slurry was heated to 60° C., acidified to a pH of 2.0 using concentrated sulfuric acid, then treated with 1% alumina, added rapidly as a 357 gram/liter aqueous sodium aluminate solution over a five minute period. During the addition of the sodium aluminate solution, the pH of the slurry was maintained between a value of 8.0 and 8.5 via the addition of sulfuric acid, prior to further digestion for 15 minutes at 60° C. After this, adjustment of the pigment slurry pH to a value of 6.2 using 20% by weight aqueous sodium hydroxide solution was followed by digestion for an additional 15 minutes at 60° C., with final readjustment of the pH to 6.2, if necessary. The dispersion was then filtered while hot. The resulting filtrate was washed with an amount of water, which had been preheated to 60° C. and pre-adjusted to a pH of 7.0, equal to the weight of recovered pigment. The washed filtrate was subsequently re-dispersed in water with agitation, in the presence of 0.25% by weight based on pigment of acetic acid as a fluidizing agent, to yield a 60% solids aqueous titanium dioxide dispersion having a pH of 4.4. The dispersion viscosity was found to be 50 cps, as determined utilizing a Brookfield Viscosimeter (Model DV-1, Spindle #5, 100 rpm) (Brookfield Engineering Labs, Inc. Stoughton, Mass.).

A 1% aliquot by weight based on pigment of hexyltrimethoxysilane was added to the resulting titanium dioxide dispersion with mixing, and the resulting pigment dispersion was then spray dried using an APV Nordic PSD52 Spray Dryer (Invensys APV Silkeborg, Denmark), maintaining a dryer inlet temperature of approximately 280° C., to yield a dry pigment powder. For one thousand grams of pigment the time required to carry out the spray drying and simultaneous hexyltrimethoxysilane treatment step was fifteen minutes. The dry pigment powder was then steam micronized in the presence of 0.35% by weight based on pigment of trimethylol propane utilizing a steam to pigment weight ratio of five, with a steam injector pressure set at 146 psi and micronizer ring pressure set at 118 psi, completing the finished pigment preparation.

As a comparative example, the same procedure described above was repeated, but in the absence of the addition of the fluidizing agent. As a result, the titanium dioxide dispersion had to be diluted with water to a solids content of less than 40% in order to lower the viscosity sufficiently to enable pumping to the spray dryer. At 38% solids, the viscosity of the aqueous titanium dioxide dispersion was found to be 1480 cps, as measured on a Brookfield Viscosimeter (Model DV-1, Spindle #5, 100 rpm), with a dispersion pH of 7.8. For one thousand grams of pigment the time required to carry out the spray drying and simultaneous hexyltrimethoxysilane treatment step was forty-five minutes, as opposed to the fifteen minutes experienced with the inventive process.

The pigment produced according to the inventive process was evaluated in titanium dioxide/polyethylene concentrates, according to the following procedure:

One hundred and nine and one-half (109.5) grams of the pigment was mixed with thirty-six and one-half (36.5) grams of Dow 4012 low density polyethylene (Dow Chemical Company), and 0.05% by weight based on polyethylene of an 80/20 mixture of tris(2,4-di-tertbutylphenyl)phosphite and octadecyl-3-(3,5-di-tertbutyl-4-hydroxyphenyl)propionate, to prepare a 75% by weight titanium dioxide-containing polyethylene concentrate via mastication of the mixture in the mixing bowl of a Plasticorder Model PL-2000 (C.W. Brabender Instruments, Inc. South Hackensack, N.J.) at 100° C. and a mixing speed of 100 rpm. Instantaneous torque and temperature values were then recorded for a nine minute period to ensure equilibrium mixing conditions had been attained. Equilibrium torque values were determined via averaging the measured instantaneous torque values for a two minute period after equilibrium mixing conditions had been achieved. The resulting pigment concentrate was cooled and ground into pellets. The melt flow index value was determined on the resulting pellet concentrate using ASTM method D1238, procedure B. Maximum extruder processing pressure was determined by extruding 100 grams of the 75% concentrate through a 500 mesh screen filter using a 0.75 inch barrel, 25/1 length to diameter extruder attached to the aforementioned Brabender Plasticorder, at an average processing temperature of approximately 190° C. and at 75 rpm, while recording instrument pressure values at the extruder die. Results from these evaluations are provided in Table 1.

TABLE 1

Processing Behavior of Titanium Dioxide-Containing Polyethylene Concentrates

| Pigment Sample: | Melt Flow Index (g/10 minutes: 190 C.) | Equilibrium Torque (meter-grams) | Max. Extruder Pressure (psi) |
|---|---|---|---|
| Example 1 | 5 | 1230 | 590 |

In addition to the manufacturing throughput and energy usage advantages detailed above, the hexyltrimethoxysilane-treated titanium dioxide produced according to the process of the instant invention demonstrates utility as an additive in pigmented thermoplastic compositions as indicated by the melt flow index, equilibrium torque, and maximum extruder pressure values observed for the thermoplastic concentrate containing said pigment.

Example 2

Particulate titanium dioxide pigment intermediate obtained from the vapor phase oxidation of titanium tetrachloride and containing 0.8% alumina in its crystalline lattice was dispersed in water in the presence of 0.18% by weight (based on pigment) of sodium hexametaphosphate dispersant, along with a sufficient amount of sodium hydroxide to adjust the pH of the dispersion to about 9.5 and greater, to achieve an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer. The slurry was heated to 60° C., acidified to a pH of 2.0 using concentrated sulfuric acid, then treated with 1% alumina, added rapidly as a 357 gram/liter aqueous sodium aluminate solution over a five minute period. During the addition of the sodium aluminate solution, the pH of the slurry was maintained between a value of 8.0 and 8.5 via the addition of sulfuric acid, prior to further digestion for 15 minutes at 60° C. After this, adjustment of the pigment slurry pH to a value of 6.2 using 20% by weight aqueous sodium hydroxide solution was followed by digestion for an additional 15 minutes at 60° C., with final readjustment of the pH to 6.2, if necessary. The dispersion was then filtered while hot. The resulting filtrate was washed with an amount of water, which had been preheated to 60° C. and pre-adjusted to a pH of 7.0, equal to the weight of recovered pigment. The washed filtrate was subsequently re-dispersed in water with agitation, in the presence of 0.35% by weight based on pigment of lactic acid as a fluidizing agent, to yield a 60% solids aqueous titanium dioxide dispersion having a pH of 4.7. The dispersion viscosity was found to be 60 cps, as determined utilizing a Brookfield Viscosimeter (Model DV-1, Spindle #5, 100 rpm).

A 1% aliquot by weight based on pigment of octyltriethoxysilane/tetraethylorthosilicate copolymer (synthesized according to the teachings of Example 1 in U.S. Pat. No. 6,455,158 B1, the details of which are incorporated herein by reference, and yielding a 100 centistoke fluid) was added to the resulting titanium dioxide dispersion with mixing, and the resulting pigment dispersion was then spray dried using an APV Nordic PSD52 Spray Dryer, maintaining a dryer inlet temperature of approximately 280° C., to yield a dry pigment powder. For one thousand grams of pigment, the time required to carry out the spray drying and simultaneous octyltriethoxysilane/tetraethylorthosilicate copolymer treatment step was fifteen minutes. The dry pigment powder was then steam micronized in the presence of 0.35% by weight based on pigment of trimethylol propane utilizing a steam to pigment weight ratio of five, with a steam injector pressure set at 146 psi and micronizer ring pressure set at 118 psi, completing the finished pigment preparation.

As a comparative example, the same procedure described above was repeated, but in the absence of the addition of the fluidizing agent. As a result, the titanium dioxide dispersion had to be diluted with water to a solids content of less than 40% in order to lower the viscosity sufficiently to enable pumping to the spray dryer. At 38% solids, the viscosity of the aqueous titanium dioxide dispersion was found to be 1480 cps, as measured on a Brookfield Viscosimeter (Model DV-1, Spindle #5, 100 rpm), with a dispersion pH of 7.8. For one thousand grams of pigment, the time required to carry out the spray drying and simultaneous octyltriethoxysilane/tetraethylorthosilicate copolymer treatment step was forty-five minutes, as opposed to the fifteen minutes experienced with the inventive process.

The pigment produced according to the inventive process was evaluated in titanium dioxide/polyethylene concentrates, according to the procedure described in Example 1. Results from these evaluations are provided in Table 2.

TABLE 2

Processing Behavior of Titanium Dioxide-Containing Polyethylene Concentrates

| Pigment Sample: | Melt Flow Index (g/10 minutes: 190 C). | Equilibrium Torque (meter-grams) | Max. Extruder Pressure (psi) |
|---|---|---|---|
| Example 2 | 4 | 1250 | 690 |

In addition to the manufacturing throughput and energy usage advantages detailed above, the octyltriethoxysilane/tetraethylorthosilicate copolymer-treated titanium dioxide produced according to the process of the instant invention further demonstrates utility as an additive in pigmented thermoplastic compositions as indicated by the melt flow index, the equilibrium torque, and the maximum extruder pressure values observed for the thermoplastic concentrate containing said pigment.

Example 3

Particulate titanium dioxide pigment intermediate obtained from the vapor phase oxidation of titanium tetrachloride and containing 0.6% alumina in its crystalline lattice was dispersed in water in the presence of 0.18% by weight (based on pigment) of sodium hexametaphosphate dispersant, along with a sufficient amount of sodium hydroxide to adjust the pH of the dispersion to about 9.5 and above, to achieve an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer. The slurry was heated to 50° C., acidified to a pH of about 5.0 using concentrated sulfuric acid, then treated with 0.25% zirconia, added rapidly as a 200 gram/liter aqueous zirconium orthosulfate solution, over a five minute period. After the addition of the zirconium orthosulfate, the slurry was maintained at 50° C., adjusted to a pH of 8.0 using 20% by weight aqueous sodium hydroxide solution, then treated with 2.8% alumina, added as a 357 gram/liter aqueous sodium aluminate solution over a fifteen minute period. During the addition of the sodium aluminate solution, the pH of the slurry was maintained between a value of 8.0 and 8.5 via the addition of sulfuric acid, prior to an additional 15 minute digestion at 50° C., after the completion of the addition of the sodium aluminate solution. The dispersion was then filtered while hot. The resulting filtrate was washed with an amount of water, which had been preheated to 60° C. and pre-adjusted to a pH of 7.0, equal to the weight of recovered pigment. The washed filtrate was subsequently re-dispersed in water with agitation, in the presence of 0.50% by weight based on pigment, of acetic acid as a fluidizing agent, to yield a 60% solids aqueous titanium dioxide dispersion having a pH of 4.5. The dispersion viscosity was found to be 50 cps, as determined utilizing a Brookfield Viscosimeter (Model DV-1, Spindle #5, 100 rpm).

A 1% aliquot by weight based on pigment of chloropropyltrimethoxysilane was added to the resulting titanium dioxide dispersion with mixing, and the resulting pigment dispersion was spray dried using an APV Nordic PSD52 Spray Dryer, maintaining a dryer inlet temperature of approximately 280° C., to yield a dry pigment powder. For one thousand grams of pigment, the time required to carry out the spray drying and simultaneous chloropropyltrimethoxysilane treatment step was fifteen minutes. The dry pigment powder was then steam micronized in the presence of 0.35% by weight based on pigment of trimethylol propane utilizing a steam to pigment weight ratio of five, with a steam injector pressure set at 146 psi and micronizer ring pressure set at 118 psi, completing the finished pigment preparation.

As a comparative example, the same procedure described above was repeated, but in the absence of the addition of the acetic acid fluidizing agent. As a result, the titanium dioxide dispersion had to be diluted with water to a solids content of less than 40% in order to lower the viscosity sufficiently to enable pumping to the spray dryer. At 38% solids, the viscosity of the aqueous titanium dioxide dispersion was found to be 900 cps, as measured on a Brookfield Viscosimeter (Model DV-1, Spindle #5, 100 rpm), with a dispersion pH of 8.0. For one thousand grams of pigment, the time required to carry out the spray drying and simultaneous chloropropyltrimethoxysilane step was forty minutes, as opposed to the fifteen minutes experienced with the inventive process.

The pigment produced according to the inventive process was evaluated in a water-borne coating, according to the recipe and test procedures below.

| Ingredients | Parts by Weight |
| --- | --- |
| Propylene Glycol | 11.9 |
| Tamol ® 731 | 2.4 |
| Igepal ® CO-630 | 1.3 |
| Foammaster ® SA-3 | 0.24 |
| Water | 10.2 |
| Titanium dioxide pigment | 59.8 |

The above components were added in the sequence indicated and mixed at 1000 rpm for twenty minutes, after which the components listed below were added in sequence with continued mixing until homogeneity was achieved, to yield a 22 PVC (pigment volume concentration), 36% NVV (percent non-volatiles by volume) water-borne coating with final pH=8.8 and final viscosity=five poise.

| Ingredients | Parts by Weight |
| --- | --- |
| Rhoplex ® AC-2508 | 122.5 |
| Foammaster ® SA-3 | 0.20 |
| Ammonium Hydroxide (25%) | 0.20 |
| Water | 11.2 |
| Texanol ® | 5.6 |
| Natrosol ® 250 MR (added as a 2.5% solution containing Proxel ® GXL preservative) | 10.2 |
| Lamp black | 1.6 |

Texanol ® ester alcohol = 2,2,4-trimethyl-1,3-pentanediol mono (2-methylpropanoate); Eastman Chemicals Company
Tamol ® 731 = diisobutylene/maleic acid alternating copolymer disodium salt 25% in water; Rohm and Haas Company
Igepal ® CO-630 = nonylphenoxy poly(ethyleneoxy)$_9$ ethanol; Rhodia Inc.
Foammaster ® SA-3 = oil-based defoamer; Cognis Corporation
Rhoplex ® AC-2508 = aqueous poly(butylacrylate-co-methylmethacrylate) latex dispersion; Rohm and Haas Company
Natrosol ® 250 MR = hydroxyethyl cellulose; Hercules Incorporated Aqualon Division
Lamp black = Colortrend ® B-Lamp Black; dispersion in mixed glycol solvent; Tenneco Chemicals, Inc.
Proxel ® GXL = 1,2-benzoisothiazoline-3-one; Avecia Inc.

Gloss and tint strength measurements were then performed on the above coating composition according to ASTM method D-523-89 and ASTM method D-2745-00, respectively, with the results provided in Table 3.

TABLE 3

Paint Film Properties of Organosilicon Compound-Treated TiO$_2$-Containing Water-Borne Paints

| Pigment Sample: | Gloss (60°) | Tint Strength |
| --- | --- | --- |
| Example 3 | 68 | 103 |

In addition to the manufacturing throughput and energy usage advantages detailed above, the chloropropyltrimethoxysilane-treated titanium dioxide produced according to the process of the instant invention thus demonstrates utility as a pigment in a water-borne coating composition, as indicated by the gloss and tint strength values of the paint containing said pigment.

Example 4

Particulate titanium dioxide pigment intermediate obtained from the vapor phase oxidation of titanium tetrachloride and containing 0.6% alumina in its crystalline lattice was dispersed in water in the presence of 0.18% by weight (based on pigment) of sodium hexametaphosphate dispersant, along with a sufficient amount of sodium hydroxide to adjust the pH of the dispersion to about 9.5 and above, to achieve an aqueous dispersion with a solids content of 35% by weight. The resulting titanium dioxide slurry was sand milled, using a zircon sand-to-pigment weight ratio of 4 to 1, until a volume average particle size was achieved wherein more than 90% of the particles were smaller than 0.63 microns, as determined utilizing a Microtrac X100 Particle Size Analyzer. The slurry was heated to 50° C., acidified to a pH of about 5.0 using concentrated sulfuric acid, then treated with 0.25% zirconia, added rapidly as a 200 gram/liter aqueous zirconium orthosulfate solution, over a five minute period. After the addition of the zirconium orthosulfate, the slurry was maintained at 50° C., adjusted to a pH of 8.0 using 20% by weight aqueous sodium hydroxide solution, then treated with 2.8% alumina, added as a 357 gram/liter aqueous sodium aluminate solution over a fifteen minute period. During the addition of the sodium aluminate solution, the pH of the slurry was maintained between a value of 8.0 and 8.5 via the addition of sulfuric acid, prior to an additional 15 minute digestion at 50° C., after the completion of the addition of the sodium aluminate solution. The dispersion was then filtered while hot. The resulting filtrate was washed with an amount of water, which had been preheated to 60° C. and pre-adjusted to a pH of 7.0, equal to the weight of recovered pigment. The washed filtrate was subsequently re-dispersed in water with agitation, in the presence of 0.25% by weight based on pigment, of methanesulfonic acid as a fluidizing agent, to yield a 60% solids aqueous titanium dioxide dispersion having a pH of 4.5. The dispersion viscosity was found to be 50 cps, as determined utilizing a Brookfield Viscosimeter (Model DV-1, Spindle #5, 100 rpm).

A 0.65% aliquot by weight based on pigment of hexyltrimethoxysilane was added to the resulting titanium dioxide dispersion with mixing, and the resulting pigment dispersion was spray dried using an APV Nordic PSD52 Spray Dryer, maintaining a dryer inlet temperature of approximately 280° C., to yield a dry pigment powder. For one thousand grams of pigment, the time required to carry out the spray drying and simultaneous hexyltrimethoxysilane treatment step was fifteen minutes. The dry pigment powder was then steam micronized in the presence of 0.35% by weight based on pigment of trimethylol propane utilizing a steam to pigment weight ratio of five, with a steam injector pressure set at 146 psi and micronizer ring pressure set at 118 psi, completing the finished pigment preparation.

As a comparative example, the same procedure described above was repeated, but in the absence of the addition of the methanesulfonic acid fluidizing agent. As a result, the titanium dioxide dispersion had to be diluted with water to a solids content of less than 40% in order to lower the viscosity sufficiently to enable pumping to the spray dryer. At 38% solids, the viscosity of the aqueous titanium dioxide dispersion was found to be 900 cps, as measured on a Brookfield Viscosimeter (Model DV-1, Spindle #5, 100 rpm), with a dispersion pH of 8.0. For one thousand grams of pigment, the time required to carry out the spray drying and simultaneous hexyltrimethoxysilane step was forty minutes, as opposed to the fifteen minutes experienced with the inventive process.

The resulting pigment produced according to the inventive process was evaluated in a water-borne coating, according to the recipe and test procedures described in Example 3. Results are provided in Table 4.

TABLE 4

Paint Film Properties of Organosilicon Compound-Treated TiO$_2$-Containing Water-Borne Paints

| Pigment Sample: | Gloss (60°) | Tint Strength |
|---|---|---|
| Example 4 | 67 | 111 |

In addition to the manufacturing throughput and energy usage advantages detailed above, the hexyltrimethoxysilane-treated titanium dioxide produced according to the process of the instant invention demonstrates utility as a pigment in a water-borne coating composition, as indicated by the gloss and tint strength of the paint containing said pigment.

What is claimed is:

1. An improved process for making an organosilicon compound surface-treated titanium dioxide material, comprising the steps of:
    (a) forming a mixture comprising a titanium dioxide material in water;
    (b) wet milling said mixture;
    (c) adjusting the pH of a slurry resulting from step (b) to between about 5.0 and about 8.5;
    (d) after step (c), removing said titanium dioxide material from said mixture by vacuum or pressure filtration;
    (e) after step (d), washing said titanium dioxide material;
    (f) after step (e), converting said washed titanium dioxide material to a fluid dispersion having a pH value of about 3.5 to less than about 7 via addition of a fluidizing agent comprising a water-soluble monoprotic acid;
    (g) after, or concurrently with, step (f), adding to the resulting dispersion of titanium dioxide material an organosilicon compound as a organic surface treatment, with mixing; and
    (h) after step (g), spray drying the dispersion of the washed titanium dioxide material resulting from step (g) to yield a dry titanium dioxide pigment powder.

2. A process as defined in claim 1, comprising the further step after step (b) and before step (c) of depositing on the wet milled titanium dioxide material one or more inorganic oxides selected from the group consisting of the oxides of aluminum, boron, cerium, phosphorus, silicon, tin, titanium and zirconium.

3. A process as defined in claim 2, wherein in step (g), the addition of an organosilicon compound is accomplished without substantial dilution of the titanium dioxide material.

4. A process as defined in claim 1, wherein in step (g), the addition of an organosilicon compound is accomplished without substantial dilution of the titanium dioxide material.

5. A process as defined in claim 4, wherein the washed titanium dioxide material is characterized by a titanium dioxide solids content of from about 40 percent by weight to about 70 percent by weight and a Brookfield viscosity of more than 10,000 cps, and further wherein the addition of the fluidizing agent provides a fluid dispersion for spray drying having a Brookfield viscosity of less than about 1000 cps.

6. A process as defined in claim 5, wherein the fluid dispersion is characterized by a Brookfield viscosity of less than about 500 cps.

7. A process as defined in claim 6, wherein the fluid dispersion is characterized by a Brookfield viscosity of less than about 100 cps.

8. A process as defined in claim 3, wherein apart from any organosilicon compound added for providing an organic surface treatment of the titanium dioxide material, essentially only the fluidizing agent is added to the washed titanium dioxide material before a dispersion is formed and then spray dried in step h), and further wherein the fluidizing agent after the addition comprises between about 0.025% by weight and about 2% by weight of the titanium dioxide material.

9. A process as defined in claim 8, wherein the fluidizing agent after the addition comprises between about 0.05% by weight and about 1% by weight of the titanium dioxide material.

10. A process as defined in claim 8, wherein the fluidizing agent after the addition comprises between about 0.10% by weight and about 0.5% by weight of the titanium dioxide material.

11. A process as defined in claim 1, wherein the fluidizing agent is an aqueous solution of one or more water-soluble monoprotic acids selected from the group consisting of nitric acid, hydrochloric acid, and carboxylic acids, sulfonic acids, phosphoric acid diesters and phosphinic acids containing less than about eight carbon atoms.

12. A process as defined in claim 11, wherein the fluidizing agent is an aqueous solution of one or more of formic acid, acetic acid, propionic acid, lactic acid, glycolic acid, methanesulfonic acid, p-toluenesulfonic acid, phosphoric acid dimethyl ester, methylphosphonic acid monomethyl ester, dimethylphosphinic acid, hydrochloric acid and nitric acid.

13. A process as defined in claim 1, wherein an alkyltrialkoxysilane or a dialkyldialkoxysilane is added for the organic surface treatment of the titanium dioxide material in step (g).

14. A process as defined in claim 1, further comprising the step of processing the dry titanium dioxide pigment powder produced in step (h) in a fluid energy mill.

* * * * *